Patented Dec. 3, 1940

2,223,948

UNITED STATES PATENT OFFICE 2,223,948

DULCITOL AND MANNITOL BORATES AND SALTS THEREOF

Clarence Bremer, Tamaqua, Pa., assignor to Atlas Powder Company, Wilmington, Del., a corporation of Delaware No Drawing. Application June 23, 1937, Serial No. 149,839

11 Claims. (Cl. 260—462)

This invention relates to new hexahydric alcohol borates and alkali metal salts thereof.

An object of this invention is the production of water soluble condensation products of mannitol or dulcitol with boric acid or alkali metal (including ammonium) salts of boric acid, or with mixtures of boric acid and alkali metal hydroxide.

Another object of the invention is the production of such compounds which are stable and do not hydrolyze to the alcohol and boric acid upon dissolution in water.

A further object of the invention is the production of such compounds which are resinous in appearance and the production of crystalline products therefrom.

A further object of the invention is the production of water soluble derivatives of hexahydric alcohols selected from the group consisting of:— mannitol and dulcitol—in which the hydrogen atom of at least one secondary alcohol group has been replaced with a boron radical selected from that group of radicals represented by —B(OH)R; —BRR'; —BR'R², where R is OH or OM, M being an alkali metal, R' is a bond to the oxygen atom and replaces the hydrogen atom of another secondary alcohol group of the hexahydric alcohol, and R² is a bond to the oxygen atom and replaces the hydrogen atom of a third alcohol group of the hexahydric alcohol.

A still further object of the invention is the production of new and superior borates of great stability which are suitable for use as coating compositions for paper and textiles; ingredients in cosmetics and hair waving compounds; ingredients in electrolytic condensers; ingredients in pharmaceutical preparations and adhesives, and for many other uses where adhesiveness, relatively high viscosity, good electrical conductivity, and resistance to hydrolysis, are desirable.

Reaction products of boric acid and other polyhydric alcohols, principally glycol and glycerine, have been prepared and used extensively in the arts. The reaction product of boric acid and glycerol is exemplary, and in such a product condensation takes place on the first and second carbon atoms of the glycerol, thereby involving one primary and one secondary alcohol group as shown by the following formula:

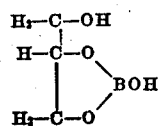

Because of their ease of hydrolysis, such reaction products have certain disadvantages. When dissolved in water, even in 95% concentration, a glycerol-borate will hydrolyze to glycerol and boric acid, the latter crystallizing out on cooling to room temperature.

Now I have found that I can produce dulcitol or mannitol borates and alkali-metal salts thereof which do not hydrolyze to the hexahydric alcohol and boric acid or to the hexahydric alcohol and the alkali-metal borate when dissolved in water. For convenience the alkali metal borates will be discussed later. The non-alkalized borates, as will hereinafter more fully appear, have various degrees of condensation as, for example, the mono-, di-, and tricondensation products of dulcitol or mannitol monoborate, and the tetracondensation product of dulcitol or mannitol diborate. These condensation products are characterized by the fact that when dissolved in water, they do not hydrolyze to boric acid and dulcitol or mannitol as the case may be, and the di-, tri-, and tetracondensation products are further characterized by their hydrolysis to the non-hydrolyzing monoborate monocondensation product when dissolved in water. Thus, if an aqueous solution which is saturated at elevated temperatures with a non-alkalized borate is cooled, crystallization occurs, but the precipitate formed is neither boric acid nor the hexahydric alcohol but is a definite compound of the hexahydric alcohol and boric acid.

These straight boric acid-hexahydric alcohol condensation products are acidic in character and have a pH of about 2. The acidic products can be neutralized or made basic in character as desired by the addition thereto of alkalis, such as ammonium hydroxide, ammonia, sodium hydroxide, potassium hydroxide, lithium hydroxide, etc.; or the required amount of an alkali metal borate can be substituted for boric acid in the reaction mixture, thereby leading directly to the production of materials of the desired pH. Where the alkali is added in aqueous solution to a di- or tetra-condensation product hydrolysis of the condensation product will occur and the salt of the monocondensation product is formed, which on further heating to drive off all water introduced in the neutralization recondenses to form the salt of the di- or tetra-condensation product. The addition of 0.75 to 0.80 mol of alkali per atom of boron in the hexitol borate will produce a product of pH 7, whereas the addition of one mol of alkali per atom of boron in the hexitol borate will produce the corresponding alkali salt having a pH value of about 10.6. For example, a neutral product (pH of 7.0) may be prepared by reacting one mol of mannitol and one mol of boric acid and adding to the resinous melt 0.8 mol of sodium hydroxide per mol of mannitol. However, if one mol of sodium hydroxide is added to the resinous melt, the pH will be 10.6, which is the pH value of the sodium mannitol monoborate. A neutral diborate product of pH 7 may be prepared by reacting one mol of mannitol and two mols of boric acid and adding to the resinous melt 1.5 mols of sodium hydroxide per mol of mannitol which is equivalent to 0.75 mol of sodium hydroxide per atom of boron. Furthermore, if two mols of sodium hydroxide are added to this resinous melt, the pH will be 10.6.

These alkali metal borates of dulcitol or mannitol are similar to the borates from which they may be prepared in that when dissolved in water, they hydrolyze to the corresponding non-hydrolyzing alkali metal monoborate monocondensation product, but no further hydrolysis takes place. For example, ammonium mannitol monoborate dicondensation product of pH 10.6 will hydrolyze to the ammonium mannitol monoborate monocondensation product when dissolved in sufficient water, but the compound is not further hydrolyzed to ammonium borate and mannitol. Neutral products of pH 7 comprise an equilibrium mixture of the straight hexahydric alcohol borate and the alkali metal salt thereof. Such products when dissolved in sufficient water hydrolyze to a mixture of the hexahydric alcohol monoborate·monocondensation product and the alkali metal salt thereof, but again no further hydrolysis takes place. A 50% aqueous solution of such a neutral product will precipitate crystals of the hexahydric alcohol monoborate monocondensation product upon cooling to 0° C.

It can be seen, therefore, that the stability which prevents hydrolysis to the hexahydric alcohol and boric acid or alkali metal borate is characteristic of the dulcitol and mannitol borates of the present invention regardless of whether the borate is acidic or basic. Adjustment of pH upwardly or downwardly merely tends to increase or decrease the percentage of alkalized hexahydric alcohol borate present.

Clear, resin-like embodiments of the invention may be obtained by reacting one mol of dulcitol or mannitol with one or two mols of boric acid. The reaction of mol for mol ratios results in the production of dulcitol or mannitol monoborates, whereas the reaction of one mol of the alcohol with two mols of boric acid results in the formation of dulcitol or mannitol diborates.

In the preparation of these borates, the ingredients are preferably dissolved in a relatively large amount of water, say from 4 to 12 mols of water per mol of dulcitol or mannitol present in the reaction mixture. The mixture thus obtained is then heated at a temperature of 115 to 120° C. for a sufficient period of time to drive off the water which must be removed to form the desired condensation product. Thus, with a mixture of one mol of mannitol, one mol of boric acid and 10 mols of water, removal from the reaction mixture of about 12 mols of water results in the production of the monoborate dicondensation product.

The use of large proportions of water in the reaction mixture is advantageous since the water serves as a vehicle and facilitates mixing and reaction of the ingredients.

In the preparation of dulcitol or mannitol borates having a pH value above 2, I find it preferable to react the hexahydric alcohol and the boric acid first and to add at the end of the reaction the amount of alkali metal hydroxide required to adjust the melt to the desired pH. When the alkali metal hydroxide is added to the reaction mixture after the reaction between the hexahydric alcohol and the boric acid is substantially complete, it is more effective than when it is added at the beginning, especially if the hexahydric alcohol borate melt is permitted to cool to about 100° C. before addition of the alkali metal hydroxide. When adjusted upwardly from pH 2 in this manner, products of pH value of from 2 to 10 have the non-alkalized borate present in sufficient amount so that 50% aqueous solutions will precipitate the monoborate monocondensation product in crystalline form when cooled to 0° C.

However, the preparation of dulcitol or mannitol borates having a pH above 2 is not to be considered as limited in this respect. The alkali metal hydroxide may be employed as a starting material in the reaction mixture if so desired, or the alkali metal salts of boric acids, such as ammonium borate, sodium metaborate, sodium tetraborate, sodium perborate, potassium metaborate, potassium tetraborate, lithium metaborate, lithium tetraborate, and the like, may be employed as a starting material in place of all or part of the boric acid. If desired, the ingredients may be reacted in amounts which will result in a product of a pH value above that desired so that final adjustment of pH value can be made downwardly with boric acid. Such downward adjustment of pH value may result in the presence of unreacted boric acid, but the non-alkalized borate is present in sufficient amount at about pH 7 so that 50% aqueous solutions will precipitate crystals of the monoborate monocondensation product when cooled to 0° C.

Consequently, the invention is not to be considered as limited with respect to the pH value of the product, nor with respect to the manner of obtaining the desired pH value in the products. While in the following description of various embodiments of the invention, the acidic products have been chosen for purposes of illustration, so that in the following formulas R in the boron radical represents OH, it is to be understood that R may be OH or OM, where M is an alkali metal, without departing from the invention.

In reacting equimolecular quantities of dulcitol or mannitol and boric acid, I find that the first condensation takes place through a secondary alcohol group. Further condensation takes place involving one or two additional hydroxyl groups, depending upon the amount of water volatilized during the reaction.

For example, when one mol of mannitol and one mol of boric acid are reacted, according to my process, until 2 mols of water have been volatilized, a clear, resin-like, mannitol monoborate dicondensation product is obtained. The structure of this product has been determined to be—

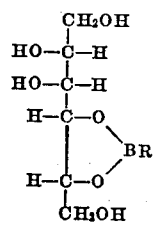

where R represents OH—by acetonation, acetylation, tritylation, combustion analysis, and molecular weight.

If such a reaction be continued until 2.4 mols of water have been volatilized, a clear, resin-like mixture of the dulcitol or mannitol monoborate dicondensation product and a dulcitol or mannitol monoborate tricondensation product is obtained. The structure of the tricondensation product is similar to that of the dicondensation product in that at least two secondary alcohol groups of the hexitol are involved in the condensation. However, an additional molecule of water is eliminated so that the boric acid is condensed with three instead of two alcohol groups of the hexitol. It is not known positively whether the third condensation takes place upon a primary or a secondary alcohol group, although the evidence points to the latter.

The diborate, tetracondensation products of mannitol and dulcitol may be prepared by reacting one mol of the hexitol with 2 mols of boric acid until 4 mols of water have been removed. Again condensation takes place between the secondary alcohol groups of the hexitol and the boric acid, and no primary alcohol groups of the hexitol are involved in the condensation. The structure of such a diborate of mannitol, as confirmed by combustion analysis, acetylation and tritylation, may be written as follows:

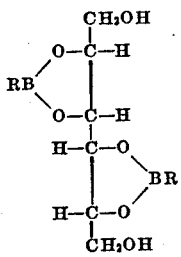

where R represents OH.

The structure of the diborate of dulcitol has been similarly confirmed, and assuming transcondensation has taken place, its structural formula may be written as follows:

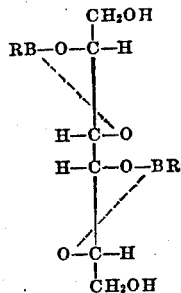

where R represents OH.

The foregoing di-, tri-, and tetracondensation products of dulcitol or mannitol, or mixtures thereof, may be hydrolyzed to the corresponding monoborate monocondensation product by dissolving the products or mixtures thereof in water. In order to induce such hydrolysis, the concentration of the solution should be such that the amount of water present is considerably in excess of that theoretically required to convert the di-, tri-, or tetracondensation product to the monocondensation product.

The dulcitol and mannitol monoborate monocondensation products have the boric acid radical condensed with a secondary alcohol group of the hexahydric alcohol and the non-alkalized products are of the formula $C_6H_{13}O_6 \cdot B(OH)R$ where R is OH. These non-alkalized monoborate monocondensation products may be separated in crystalline form from aqueous solutions thereof, and when any one or more of the mono-, di-, tri-, or tetracondensation products are dissolved in an equal weight of water, the crystalline monoborate monocondensation product separates out on cooling of the solution to 0° C. The structural formula of the non-alkalized mannitol monocondensation product has been proven to be:

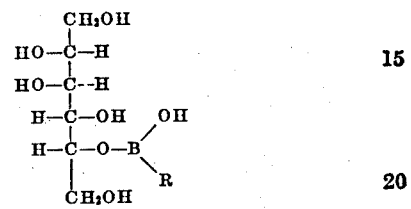

where R represents OH.

When heated, the crystalline monoborate monocondensation products lose water, and if made to lose one mol of water, the products so obtained will have exactly the same composition as the monoborate dicondensation products described above. If made to lose 1.4 mols of water, the clear, resin-like mixture of the di- and tricondensation monoborates results. The tetracondensation product cannot be formed by merely heating the crystalline monoborate for the preparation of the diborate tetracondensation product from the monoborate requires that an additional mol of boric acid or its equivalent be reacted with each mol of the monoborate.

For many purposes the diborates of dulcitol and mannitol are satisfactory, but I find that they are not as stable as the monoborates of mannitol and dulcitol. For example, when the diborates are dissolved in water and crystallization effected, I find that the crystals separating out are mixtures of boric acid and the monoborate of the hexitol, identical in composition with the crystalline monoborate described above. This is for the reason that the hydrolysis of the diborate to the monoborate releases one mol of boric acid per mol of diborate so hydrolyzed.

In the following non-limiting examples of various embodiments of the invention and their preparation, the reaction products of 1 mol of the hexitol and 1 mol of boric acid are designated as monoborates, and the reaction products of 1 mol of the hexitol and 2 mols of boric acid are designated as diborates. Where the product was neutralized or partially neutralized, the example specifies the cation used and the pH to which the product was adjusted. The borates are designated further by the terms mono-, di-, tri-, or teracondensation products, depending upon whether 1, 2, 3 or 4 mols of water are lost during the reaction.

EXAMPLE 1

*Mannitol monoborate—Acidic—Dicondensation product*

182 g. (1 mol) of mannitol and 62 g. (1 mol) of boric acid were dissolved in 180 g. (10 mols) of water. This mixture was heated at 115–120° C. until two mols of water were lost. At that time the refractive index was 1.495. This acidic borate had a pH of 2.0 and was a clear, water-white resinous melt. The product had four free hydroxyls as determined by acetin method, two of which were primary as determined by tritylation, and combustion analysis showed it to have the formula for mannitol monoborate dicondensation product as shown graphically above, whose empirical formula is $C_6H_{13}O_7 B$.

EXAMPLE 2

*Mannitol monoborate—Acidic—Mixture of di- and tri-condensation products*

182 g. (1 mol) of mannitol and 62 grams (1 mol) of boric acid were dissolved in 180 grams (10 mols) of water. This mixture was heated at 115–120° C. for approximately one hour until the refractive index was about 1.515. At this time, not only had the water of solution been driven off, but also approximately 2.4 mols of water of condensation had volatilized. This acidic borate showed a pH of about 2.0 and was a clear water-white resinous melt. Combustion analysis and acetin determination showed this product to contain 60% of the dicondensation product having an empirical formula of $C_6H_{13}O_7 B$ and 40% of the tricondensation product having an empirical formula $C_6H_{11}O_6 B$. Tritylation showed two primary alcohol groups open.

EXAMPLE 3

*Sodium mannitol monoborate pH 7.0—Mixtures of di- and tricondensation products*

The ingredients were mixed in the same proportions as in Example 2 and heated in the same manner. After the same amount of water had been driven off, the melt was cooled to 100° C. and a 50% solution of sodium hydroxide was added until a pH of 7.0 was obtained. Approximately .8 mol of caustic soda was required per mol of mannitol. The water introduced by neutralization was driven off by heating. The refractive index was 1.486. Tritylation showed the primary alcohol groups to be open.

EXAMPLE 4

*Ammonium mannitol monoborate—pH 7.0—Mixtures of di- and tricondensation products*

The ingredients were mixed in the same proportion and accorded the same treatment as in Example 2. After the same amount of water has been volatilized, the melt was cooled to 100° C. Then ammonia water containing 27% ammonia was added until the pH was approximately 7.0. Approximately 100 milliliters was required per mol of mannitol (essentially 1.4 mols of $NH_3$). An excess of ammonia was required due to the fact that on neutralization considerable ammonia was volatilized. The water introduced by neutralization was driven off by heating. The refractive index was 1.485. Tritylation showed the primary alcohol groups to be open.

EXAMPLE 5

*Mannitol monoborate—Acidic—Monocondensation product*

The ingredients were mixed in the same proportion and accorded the same treatment as in Example 1. The acid melt was then dissolved in an equal weight of water at 70–80° C. and cooled to 0° C. The mannitol monoborate crystallized out in small, needle-like crystals having a melting point of 79–80° C. The product had five free hydroxyls, as determined by acetin method, two of which were primary as determined by tritylation. Acetonation and combustion analysis showed it to have the formula of the mannitol monoborate monocondensation product as shown graphically above, whose empirical formula is $C_6H_{15}O_8 B$. It is a stable compound and may be repeatedly crystallized from water.

EXAMPLE 6

*Dulcitol monoborate—Acidic—Dicondensation product*

182 grams (1 mol) of dulcitol and 62 grams (1 mol) of boric acid were dissolved in 180 grams (10 mols) of water. This mixture was heated at 115–120° C. for approximately one hour until the refractive index was about 1.501. At this time not only had the water of solution been driven off but 2.0 mols of water of condensation had volatilized. This acidic borate had a pH value of 2.0. It was a clear resinous melt which crystallized in 24 hours to crystals having a melting point of 148–150° C. The ditrityl derivative of dulcitol was formed upon tritylation and removal of the boric acid portion. The acetin number was equivalent to four free hydroxyls and the combustion analysis showed an empirical formula $C_6H_{13}O_7 B$.

EXAMPLE 7

*Sodium dulcitol monoborate—pH 7.0—Dicondensation product*

The ingredients were mixed in the same proportion as in Example 6 and were heated in the same manner. After approximately 2 mols of water had been driven off, the melt was cooled to 100° C., and a 50% solution of sodium hydroxide was added until a pH of 7.0 was obtained. Approximately .8 mol of caustic soda was required per mol of mannitol. The water introduced by neutralization was driven off by heating. A clear, neutral melt was obtained having a refractive index of 1.488. The ditrityl derivative of dulcitol was formed upon tritylation and removal of the boric acid portion. Acetin number was equivalent to four free hydroxyls.

EXAMPLE 8

*Ammonium dulcitol monoborate—pH 7.0—Dicondensation product*

The ingredients were mixed in the same proportion and accorded the same treatment as in Example 6. After the same amount of water had been volatilized, the melt was cooled to 100° C. Then ammonia water containing 27% ammonia was added until a pH of 7.0 was obtained. Approximately 1.4 mols of $NH_3$ was required due to loss of part of the ammonia by volatilization. The additional water was driven off by heating. A clear, resinous melt was formed having a refractive index of 1.481. The ditrityl derivative of dulcitol was formed upon tritylation and removal of the boric acid portion. Acetin number was equivalent to four free hydroxyls.

EXAMPLE 9

*Dulcitol monoborate—Acidic—Monocondensation product*

The ingredients were mixed in the same proportion and accorded the same treatment as in Example 6. The acid melt was then dissolved in an equal weight of water at 70–80° C. and cooled to 0° C. The dulcitol monoborate crystallized out in small, needle-like crystals, M. P. 104–108° C. The ditrityl derivative of dulcitol was formed upon tritylation and removal of the boric acid portion. Acetin number was equivalent to five free hydroxyls. Combustion analysis showed this to have an empirical formula $C_6H_{15}O_8 B$.

EXAMPLE 10

*Mannitol diborate—Acidic—tetracondensation product*

182 grams (1 mol) of mannitol and 124 grams (2 mols) of boric acid were dissolved in about 200 milliliters of water and the mixture heated at 115–120° C. for one hour. At the end of this time not only had the water of solution been driven off, but also approximately 4.0 mols of water of condensation had volatilized. This acidic melt had a pH of 2.1 and a refractive index of 1.478. It was a clear, water-white resinous melt. Tritylation showed the two primary alcohol groups to be open. The acetin number showed two free hydroxyls. Combustion analysis showed the empirical formula to be $C_6H_{12}O_8 B_2$. When a 25% aqueous solution of mannitol diborate at 80° C. was cooled to 10° C. free boric acid crystallized out and upon cooling the filtrate to 0° C. mannitol monoborate monocondensation product (M. P. 79–80° C.) crystallized out. This was the same compound as obtained by crystallizing mannitol monoborate dicondensation product from water as described in Example 5.

EXAMPLE 11

*Sodium mannitol diborate—pH 7.0—Tetracondensation product*

The ingredients were mixed in the same proportion as in Example 10 and heated in the same manner. After approximately the same amount of water had been volatilized, the melt was cooled to 100° C. Then a 50% solution of sodium hydroxide was added until a pH of 7.0 was obtained. Approximately 1.5 mol of caustic soda per mol of mannitol was required. The water introduced by neutralization was driven off by heating. A clear resinous melt having a refractive index of 1.472 was obtained. Tritylation showed the presence of two free primary alcohol groups, while the acetin number indicated two free hydroxyls.

EXAMPLE 12

*Ammonium mannitol diborate—pH 7.0—Tetracondensation product*

The ingredients were mixed in the same proportion as in Example 10 and heated in the same manner. After approximately the same amount of water had been volatilized the melt was cooled to 100° C. Then ammonia water containing 27% $NH_3$ was added until a pH of 7.0 was obtained. Approximately 200 milliliters were required per mol of mannitol (essentially 2.8 mols $NH_3$). The additional water added during neutralization was volatilized by heating. A clear melt, with refractive index of 1.470, was obtained. Tritylation showed two free primary alcohol groups, while the acetin number was equivalent to two free hydroxyls.

EXAMPLE 13

*Dulcitol diborate—Acidic—Tetracondensation product*

182 grams (1 mol) of dulcitol and 124 grams (2 mols) of boric acid were dissolved in 270 (15 mols) of water and the mixture heated for 1 hour at 115–120° C. At the end of this time the water of solution, and in addition 4.0 mols of water of condensation, had volatilized. This acidic melt had a pH of 2.0 and a refractive index of 1.478. A clear resin was formed which solidified on standing 24 hours. A ditrityl derivative of dulcitol was formed therefrom and the acetin number was equivalent to two free hydroxyls. Combustion analysis showed an empirical formula $C_6H_{12}O_8 B_2$.

EXAMPLE 14

*Sodium dulcitol diborate—pH 7.0—Tetracondensation product*

The ingredients were mixed in the same proportion as in Example 13 and heated in the same manner. After approximately the same amount of water had been volatilized, the melt was cooled to 100° C. Then 50% sodium hydroxide was added until a pH of 7.0 was obtained. Approximately 1.5 mol of caustic soda per mol of dulcitol was required. The water introduced by neutralization was driven off by heating. A clear resin was obtained and showed a refractive index of 1.475. Tritylation showed the two primary alcohol groups to be free and the acetin number was equivalent to two free hydroxyls.

EXAMPLE 15

*Ammonium dulcitol diborate—pH 7.0—Tetracondensation product*

The ingredients were mixed in the same proportion as in Example 13 and heated in the same manner. After approximately the same amount of water was driven off, the melt was cooled to 100° C. Then 200 ml. 27% ammonia water (containing 2.8 mols $NH_3$ per mol dulcitol) was added and a clear resin with pH of 7.0 was obtained. Excess of ammonia was required due to evaporation of ammonia. The water added during neutralization was driven off and the melt then showed a refractive index of 1.470. Tritylation showed the two primary alcohol groups to be free and the acetin number was equivalent to two free hydroxyls.

The following are non-limiting examples of the preparation of borates of the invention wherein an alkali metal salt of boric acid was employed as an initial ingredient in the reaction mixture. The reaction products of one mol of the hexitol and 1 mol of boron present in the metallic borate are designated as monoborates, and the reaction products of 1 mol of hexitol and 2 mols of boron present in the metallic borate are designated as diborates.

EXAMPLE 16

*Sodium mannitol monoborate—pH 10.4—Dicondensation product*

36.4 grams (.2 mol) mannitol and 19.1 grams (.05 mol) sodium tetraborate ($Na_2B_4O_7.10H_2O$) were mixed with 36.4 grams of water and the mixture heated at 110–115° C. until (one hour) all water of solution and water of crystallization as well as 7.2 grams of water of condensation had been volatilized. A clear water-white melt was obtained. The product had a pH of 10.4 (25% solution) and about four free hydroxyl groups as determined by acetin number.

EXAMPLE 17

*Sodium mannitol diborate—pH 10.2—Tetracondensation product*

36.4 grams (.2 mol) mannitol and 38.2 grams (.1 mol) sodium tetraborate were mixed with 36.4 grams $H_2O$ and the mixture heated at 110–115° C. until (1 hour) all water of solution and water of crystallization as well as 14.4 grams of water of condensation had been volatilized. A clear water-white melt was obtained. The product had a pH of 10.2 (25% solution) and about two free hydroxyl groups as determined by acetin number.

Example 18

*Sodium dulcitol monoborate—pH 10.0—Dicondensation product*

36.4 grams (.2 mol) dulcitol and 19.1 grams (.05 mol) sodium tetraborate were mixed with 36.4 grams of water. This mixture was heated at 110–115° C. for about one hour until all water of crystallization and water of solution as well as 7.2 grams of water of condensation were volatilized. A clear water-white melt was obtained. The product had a pH of 10.0 (25% solution) and about four free hydroxyl groups as determined by acetin number.

Example 19

*Sodium dulcitol diborate—pH 10.0—tetracondensation product*

36.4 grams (.2 mol) dulcitol and 38.2 grams (.1 mol) sodium tetraborate were mixed with 36.4 grams of water. This mixture was heated at 110–115° C. until all water of crystallization and solution as well as 14.4 grams of water of condensation had been volatilized. A clear water-white melt was obtained. The product had a pH of 10.0 (25% solution) and about two free hydroxyl groups as determined by acetin number.

Example 20

*Sodium mannitol monoborate—pH 8.8—Dicondensation product*

36.4 grams (.2 mol) mannitol and 30.8 grams (.2 mol) sodium perborate (NaBO$_3$.4H$_2$O) were mixed with 36.4 grams of water. After warming slightly, oxygen was evolved very rapidly. As soon as this reaction had ceased, the mixture was heated at 110–115° C. until all water of solution and crystallization as well as 7.2 grams water of condensation had been volatilized. A clear resin-like melt, which was of a slight brown color, was obtained. The product had a pH of 8.8 (25% solution) and about four free hydroxyls as determined by acetin number. On cooling 25% to 50% aqueous solutions of the product to 0° C., crystallization of the monoborate monocondensation product occurred.

Example 21

*Sodium mannitol diborate—pH 9.0—Tetracondensation product*

36.4 grams (.2 mol) mannitol and 61.6 grams (.4 mol) sodium perborate were mixed with 36.4 grams of water. After all oxygen was evolved the mixture was heated at 110–115° C. for one hour at which time all water of crystallization and solution as well as 14.4 grams of water of condensation had been volatilized. A clear brown melt was obtained. The product had a pH of 9.0 (25% solution) and about two free hydroxyls as determined by acetin number. Hydrolysis to the boric acid and mannitol monoborate monocondensation product occurred in 75%, 50%, 25% and 10% aqueous solutions.

Example 22

*Sodium dulcitol monoborate—pH 8.8—Dicondensation product*

36.4 grams (.2 mol) of dulcitol and 30.8 grams (.2 mol) of sodium perborate were mixed with 36.4 grams of water. After all of the oxygen was evolved, the mixture was heated at 110–115° C. until all water of crystallization and solution as well as 7.2 grams of water of condensation had been volatilized, a clear brown melt was obtained. The product had a pH of 8.8 (25% solution) and about four free hydroxyls as determined by acetin number. Hydrolysis to the dulcitol monoborate monocondensation product occurred in 50% and in 25% aqueous solutions.

Example 23

*Sodium dulcitol diborate—pH 9.0—Tetracondensation product*

36.4 grams (.2 mol) of dulcitol and 61.6 grams (.4 mol) of sodium perborate were mixed and dissolved in 36.4 grams of water. After all the oxygen was evolved, this mixture was heated for 1 hour at 110–115° C. until all water of crystallization and solutions as well as 14.4 grams of water of condensation had been volatilized. A clear brown resin-like melt resulted. This product had a pH of 9.0 (25% solution) and about two free hydroxyls as determined by acetin number. Hydrolysis to the dulcitol monoborate monocondensation product and boric acid occurred in concentrations of 75%, 50%, 25% and 10% aqueous solutions.

Example 24

*Potassium mannitol monoborate—pH 9.8—Dicondensation product*

36.4 grams (.2 mol) of mannitol and 15.1 grams (.0465 mol) of potassium tetraborate (K$_2$B$_4$O$_7$.5H$_2$O) were mixed with 36.4 grams of water and this mixture heated at 110–115° C. until all water of crystallization and solution as well as 7.2 grams of water of condensation had been volatilized. A clear water-white melt was obtained. The product had a pH of 9.8 (25% solution) and about four free hydroxyls as determined by acetin number. Slight hydrolysis to mannitol monoborate monocondensation product occurred in 50% and 25% aqueous solutions.

Example 25

*Potassium mannitol diborate—pH 9.8—Tetracondensation product*

36.4 grams (.2 mol) mannitol and 30.2 grams (.093 mol) potassium tetraborate were mixed with 36.4 grams of water. This mixture was heated at 110–115° C. until all water of solution and crystallization as well as 14.4 grams of water of condensation had been volatilized. A clear water-white melt resulted. The product had a pH of 9.8 (25% solution) and about two free hydroxyl groups as determined by acetin number. Hydrolysis in 75%, 50%, 25% and 10% aqueous solutions occurred, forming boric acid and the mannitol monoborate monocondensation product.

Example 26

*Potassium dulcitol monoborate—pH 9.8—Dicondensation product*

36.4 grams (.2 mol) dulcitol and 15.1 grams (.0465 mol) potassium tetraborate were mixed with 36.4 grams of water. This mixture was heated at 110–115° C. until all water of crystallization and solution as well as 7.2 grams of water of condensation had been volatilized. A clear water-white resin-like melt was obtained. The product had a pH of 9.8 (25% solution) and about four free hydroxyl groups as determined by acetin number. In 50% aqueous solutions hydrolysis occurred, forming the dulcitol monoborate monocondensation product.

Example 27

*Potassium dulcitol diborate—pH 9.8—Tetracondensation product*

36.4 grams (.2 mol) dulcitol and 30.2 (.093 mol) of potassium tetraborate were mixed with 36.4 grams water. This mixture was heated at 110–115° C. until all water of solution and crystallization as well as 14.4 grams of water of condensation had been volatilized. A clear water-white melt was obtained. The product had a pH of 9.8 (25% solution) and about two free hydroxyl groups as determined by acetin number. Hydrolysis to boric acid and the dulcitol monoborate monocondensation product occurred in aqueous solutions.

Example 28

*Lithium mannitol monoborate—pH 10.2—Dicondensation product*

36.4 grams (.2 mol) mannitol and 13.0 grams (.05 mol) of lithium tetraborate ($Li_2B_4O_7.5H_2O$) were mixed with 36.4 grams of water. This mixture was heated at 110–115° C. until all water of crystallization and solution as well as 7.2 grams of water of condensation had been volatilized. A clear water-white melt was obtained. The product had a pH of 10.2 (25% solution) and about four free hydroxyl groups as determined by acetin number.

Example 29

*Lithium mannitol diborate—pH 10.2—Tetracondensation product*

36.4 grams (.2 mol) of mannitol and 26.0 grams (.1 mol) of lithium tetraborate were mixed with 36.4 grams of water. This mixture was heated at 110–115° C. until all water of crystallization and solution as well as 14.4 grams of water of condensation had been volatilized. A clear water-white melt was obtained. The product had a pH of 10.2 (25% solution) and about two free hydroxyl groups as determined by acetin number.

Example 30

*Lithium dulcitol monoborate—pH 10.2—Dicondensation product*

36.4 grams (.2 mol) dulcitol and 13.0 grams (.05 mol) lithium tetraborate were mixed with 36.4 grams of water. This mixture was heated at 110–115° C. until all water of solution and crystallization as well as 7.2 grams of water of condensation had been volatilized. A clear water-white resin-like melt was obtained. The product had a pH of 10.2 (25% solution) and about four free hydroxyl groups as determined by acetin number.

Example 31

*Lithium dulcitol diborate—pH 10.2—Tetracondensation product*

36.4 grams (.2 mol) dulcitol and 26.0 grams (.1 mol) lithium tetraborate were mixed in 36.4 grams of water. This mixture was heated until all water of crystallization and solution as well as 14.4 grams of water of condensation had been volatilized. A clear water-white melt was obtained. The product had a pH of 10.2 (25% solution) and about two free hydroxyl groups as determined by acetin number.

Example 32

*Ammonium mannitol monoborate—pH 4.0—Dicondensation product*

36.4 grams (.2 mol) mannitol and 13.1 grams (.024 mol) ammonium borate (($NH_4$)$_2B_{10}O_{16}.8H_2O$) were mixed with 36.4 grams of water. This mixture was heated at 110°–115° C. until all water of crystallization and solution as well as 7.2 grams of water of condensation had been volatilized. A clear slightly-yellow melt was obtained. The product had a pH of 4.0 (25% solution) and about four free hydroxyls as determined by acetin number. Hydrolysis to the mannitol monoborate monocondensation product occurred in 75%, 50%, 25% and 10% aqueous solutions.

Example 33

*Ammonium mannitol diborate—pH 4.2—Tetracondensation product*

36.4 grams (.2 mol) mannitol and 26.2 grams (.048 mol) ammonium borate were mixed with 36.4 grams of water. This mixture was heated at 110–115° C. until all water of solution and crystallization as well as 14.4 grams of water of condensation had been volatilized. A clear yellow melt was obtained. The product had a pH of 4.2 (25% solution) and about two free hydroxyl groups as determined by acetin number. Hydrolysis to boric acid and the mannitol monoborate monocondensation product occurred in aqueous solutions.

Example 34

*Ammonium dulcitol monoborate—pH 4.2—Dicondensation product*

36.4 grams (.2 mol) of dulcitol and 13.1 grams (.024 mol) ammonium borate were mixed with 36.4 grams of water. This mixture was heated at 110–115° C. until all water of solution and crystallization as well as 7.2 grams of water of condensation had been volatilized. A clear melt was obtained. The product had a pH of 4.2 (25% solution) and about four free hydroxyl groups as determined by acetin number. Hydrolysis to the dulcitol monoborate monocondensation product occurred in aqueous solution.

Example 35

*Ammonium dulcitol diborate—pH 4.2—Tetracondensation product*

36.4 grams (.2 mol) dulcitol and 26.2 grams (.048 mol) ammonium borate were mixed in 36.4 grams of water. This mixture was heated at 110–115° C. until all water of solution and crystallization as well as 14.4 grams of water of condensation had been volatilized. A clear melt was obtained. The product had a pH of 4.2 (25% solution) and about two free hydroxyl groups as determined by acetin number. Hydrolysis to boric acid and the dulcitol monoborate monocondensation product occurred in aqueous solutions.

Each of the products in Examples 16 to 35 had two primary alcohol groups as determined by tritylation.

It can be seen from the foregoing that the mannitol and dulcitol borates, and their alkali metal salts, are characterized by their stability and their failure to hydrolyze to the alcohol and boric acid, or alkali metal salt thereof, when dissolved in water. The mono-, di-, and tetracondensation products are also characterized by condensation of the boric acid, or alkali metal salt thereof, with the secondary alcohol groups only of the dulcitol or mannitol. In the case of the tricondensation products, the condensation is known to involve at least two secondary alcohol groups of the dulcitol or mannitol. However, the stability of these compounds is not to be attributed solely to such condensation for the borates of sorbitol, as disclosed in my co-pending application Serial No. 200,127, filed April 5, 1938, have the boric acid condensed with the secondary alcohol groups of the sorbitol, and yet they do not display the stability of the dulcitol and mannitol borates, but on the contrary, are readily hydrolyzed to boric acid and sorbitol upon their dissolution in water.

Some of the borates of the invention, and particularly the mannitol monoborate dicondensation product and salts thereof, have low electrical resistance, and therefore high electrical conductivity. For example, the resistance at 25° C. of several of the hexitol borates of the invention is as follows:

*Resistance—ohms/cubic centimeter*

| Product | pH | Concentration in water | | | |
|---|---|---|---|---|---|
| | | 100% | 95% | 90% | 85% |
| Mannitol monoborate dicondensation | 2.0 | 100×10⁶ | 1.2×10⁶ | 380,000 | 30,000 |
| Ammonium mannitol monoborate dicondensation | 7.0 | 10,000 | 2,000 | | 1,100 |
| Sodium mannitol monoborate dicondensation | 7.0 | 50,000 | 7,500 | 4,500 | 2,800 |
| Do | 7.5 | 45,000 | 6,800 | 4,100 | 2,600 |
| Do | 8.0 | 25,000 | 6,000 | 4,000 | 2,400 |
| Do | 8.5 | 20,000 | 5,800 | 3,800 | 2,000 |
| Do | 9.0 | 15,000 | 5,800 | 3,200 | 1,500 |

The invention is not to be considered as limited to borates having particular electrical properties, however, since the borates of the invention have great utility in many arts where their electrical properties are of little or no importance.

Having fully described my invention, what I claim is as follows:

1. A water soluble derivative of a hexahydric alcohol selected from the group consisting of mannitol and dulcitol, in which the hydrogen atom of a secondary alcohol group has been replaced with a boron radical selected from the group consisting of —B(OH)R; —BRR'; BR'R² where R is selected from the group consisting of OH and OM, M being an alkali metal, R' is a bond to the oxygen atom and replaces the hydrogen atom of another secondary alcohol group of the hexahydric alcohol, and R² is a bond to the oxygen atom and replaces the hydrogen atom of a third alcohol group of the hexahydric alcohol.

2. A water soluble derivative of a hexahydric alcohol selected from the group consisting of:—mannitol and dulcitol—in which the hydrogen atom of a secondary alcohol group has been replaced with the boron radical —BRR', where R is selected from the group consisting of OH and OM, M being an alkali metal, and R' is a bond to the oxygen atom and replaces the hydrogen atom of another secondary alcohol group of the hexahydric alcohol.

3. Mannitol monoborate dicondensation product of the following formula:

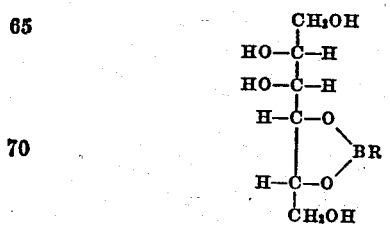

where R is selected from the group consisting of OH and OM, M being an alkali metal.

4. Mannitol monoborate dicondensation product of the following formula:

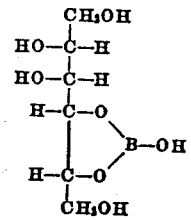

5. Mannitol diborate tetracondensation product of the following formula:

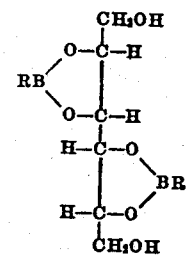

where R is selected from the group consisting of OH and OM, M being an alkali metal.

6. Mannitol diborate tetracondensation product of the following formula:

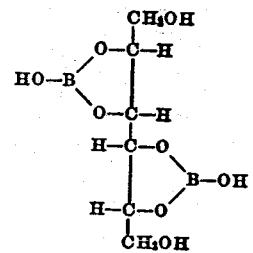

7. A water soluble derivative of a hexahydric alcohol selected from the group consisting of:—mannitol and dulcitol—in which the hydrogen atom of at least one secondary alcohol group has been replaced with a boron radical represented by —B(OH)R, where R is selected from the group consisting of OH and OM, M being an alkali metal.

8. Mannitol monoborate monocondensation product of the following formula:

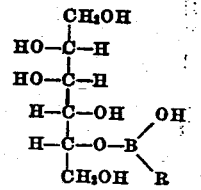

where R is selected from the group consisting of OH and OM, M being an alkali metal.

9. Mannitol monoborate monocondensation product of the following formula:

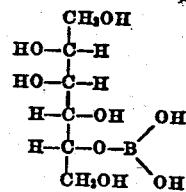

10. A water soluble condensation product of a hexahydric alcohol selected from the group consisting of:—mannitol and dulcitol—, and a compound selected from the group consisting of:—boric acid and alkali metal borates—, said product having from 1 to 4 secondary alcohol groups of the hexahydric alcohol condensed with said compound, the condensation product, when dissolved in an excess of water, having at least a portion thereof in the form of the monocondensation product of the formula $C_6H_{13}O_6 \cdot B(OH)R$ where R is selected from the group consisting of OH and OM, M being an alkali metal.

11. A water soluble condensation product of a hexahydric alcohol selected from the group consisting of:—mannitol and dulcitol—, and a compound selected from the group consisting of:—boric acid and alkali metal borates—, said product having from 1 to 4 secondary alcohol groups of the hexahydric alcohol condensed with said compounds, the condensation product, when dissolved to form a 50% aqueous solution adjusted to a pH of not more than 7, having at least a portion thereof in the form of the monocondensation product of the formula $C_6H_{13}O_6 \cdot B(OH)_2$.

CLARENCE BREMER.